United States Patent
Basson et al.

(10) Patent No.: US 8,416,803 B1
(45) Date of Patent: Apr. 9, 2013

(54) LOW LATENCY INTERCONNECT BUS PROTOCOL

(75) Inventors: Gal Basson, Haifa (IL); Tal Azogui, Ganot-Hadar (IL)

(73) Assignee: Wilocity, Ltd., Caesarea (IL)

( * ) Notice: Subject to any disclaimer, the term of this patent is extended or adjusted under 35 U.S.C. 154(b) by 46 days.

(21) Appl. No.: 12/372,009

(22) Filed: Feb. 17, 2009

Related U.S. Application Data

(60) Provisional application No. 61/028,879, filed on Feb. 14, 2008, provisional application No. 61/091,864, filed on Aug. 26, 2008.

(51) Int. Cl.
*H04J 3/16* (2006.01)
(52) U.S. Cl. .................................. 370/465; 370/468
(58) Field of Classification Search .................. 370/310, 370/464–476
See application file for complete search history.

(56) References Cited

U.S. PATENT DOCUMENTS

| | | | | |
|---|---|---|---|---|
| 7,839,876 B1* | 11/2010 | Goel et al. | | 370/412 |
| 2004/0179475 A1* | 9/2004 | Hwang et al. | | 370/229 |
| 2004/0246993 A1* | 12/2004 | An | | 370/469 |
| 2005/0152358 A1* | 7/2005 | Giesberts et al. | | 370/389 |
| 2005/0265302 A1* | 12/2005 | Nishibayashi et al. | | 370/349 |
| 2006/0013256 A1* | 1/2006 | Lee et al. | | 370/473 |
| 2006/0029099 A1* | 2/2006 | Jang et al. | | 370/473 |
| 2006/0050709 A1* | 3/2006 | Sung et al. | | 370/394 |
| 2006/0083233 A1* | 4/2006 | Nishibayashi et al. | | 370/389 |
| 2006/0083234 A1* | 4/2006 | Sung et al. | | 370/389 |
| 2006/0221875 A1* | 10/2006 | Trainin | | 370/282 |
| 2007/0110055 A1* | 5/2007 | Fischer et al. | | 370/389 |
| 2007/0113140 A1* | 5/2007 | Roh et al. | | 714/748 |
| 2008/0288661 A1* | 11/2008 | Galles | | 710/3 |
| 2009/0003335 A1* | 1/2009 | Biran et al. | | 370/389 |
| 2010/0054215 A1* | 3/2010 | Stahl et al. | | 370/337 |

* cited by examiner

*Primary Examiner* — Jeffrey M Rutkowski
*Assistant Examiner* — Juvena Loo
(74) *Attorney, Agent, or Firm* — Myers Wolin, LLC

(57) ABSTRACT

A device and method for transmitting data over a wireless network, based on a low latency interconnect bus protocol. The low latency interconnect bus protocol is a layered protocol containing a Wireless Medium Access Control (WMAC) layer for constructing a WMAC frame from the data, and a Wireless Physical (WPHY) layer for constructing a WPHY frame from the WMAC frame. The WMAC frame includes an aggregation of a plurality of MAC Service Data Units (MSDUs), and is capable of providing a reliable link by implementing an implied ACK and a block ACK. The WPHY frame is configured to provide a mechanism for a bi-directional communication between components; and the content of the WPHY frame is determined according to a communication state between two communicating components.

18 Claims, 4 Drawing Sheets

LOW LATENCY INTERCONNECT BUS PROTOCOL

CROSS REFERENCE TO RELATED APPLICATIONS

This application claims the benefit of U.S. Provisional Application No. 61/028,879 filed on Feb. 14, 2008 and U.S. Provisional Application No. 61/091,864 filed Aug. 26, 2008, the contents of which are herein incorporated by reference.

FIELD OF THE INVENTION

The present invention relates generally to peripheral component interconnect buses.

BACKGROUND OF THE INVENTION

Peripheral component interconnect PCI Express (or "PCIe") is a high performance, generic and scalable system interconnect bus for a wide variety of applications ranging from personal computers to embedded applications. PCIe implements a serial, full duplex, multi-lane, point-to-point interconnect, packet-based, and switch-based technology. Current versions of PCIe buses allow for a transfer rate of 2.5 Gb/Sec per lane, with a total of 32 lanes.

FIG. 1 shows an illustration of a typical architecture 100 of a computing device that includes a PCIe fabric. A host bridge 110 is coupled to endpoints 120, a CPU 130, a memory 140, and a switch 150. The peripheral components are connected through endpoints 120-1 to 120-N (generally referred to as 120). Multiple point-to-point connections are accomplished by the switch 150, which provides the fanout for the I/O bus. The switch 150 provides peer-to-peer communication between different endpoints 120. That is, traffic between the switch 150 and endpoints 120 that does not involve cache-coherent memory transfers, is not forwarded to the host bridge 110. The switch 150 is shown as a separate logical element but it could be integrated into the host bridge 110.

The roundtrip time of a PCIe bus is a major factor in degrading the performance of the bus. The roundtrip time is the time period elapsed from the transmission of data, for example, by the switch 150, to the acknowledgment of the data reception by a PCIe endpoint 120. The roundtrip time of a PCIe bus depends on the delay of a link between the switch 150 and a PCIe endpoint 120. Typically, this delay is due to an Acknowledgment (ACK) and flow control update latencies caused by the layers of a PCIe bus.

In the abstract, the PCIe is a layered protocol bus, consisting of a transaction layer, a data link layer, and a physical layer. The data link layer waits to receive an ACK signal for transaction layer packets during a predefined time window. If an ACK signal is not received during this time window, unacknowledged packets are re-transmitted. This results in inefficient bandwidth utilization of the bus as it requires retransmission of packets with no data integrity problem. That is, a high latency between the PCIe components may cause poor bandwidth utilization.

In the current technology, peripheral devices are physically coupled to the PCIe components (e.g., endpoints, switches, etc.). In fact, these PCIe components are always connected on the same electric board. Thus, the roundtrip time is typically very short and the PCIe is not designed to properly operate in a high latency environment.

In the related art, a few solutions have been proposed to wirelessly connect peripheral devices. These solutions are addressed to replace bus connectivity where the latency of the bus is not critical to the operation of the devices. However, connectivity of PCIe components over the air would significantly increase the latency of the link, and therefore degrade the performance of the bus.

It would be therefore advantageous to provide a solution that enables the wireless connection between all types of peripheral devices to the computing device.

SUMMARY OF THE INVENTION

Certain embodiments of the invention include a device for transmitting data over a wireless network. The device is configured to operate a low latency interconnect bus protocol. The low latency interconnect bus protocol is a layered protocol containing a Wireless Medium Access Control (WMAC) layer for constructing a WMAC frame from the data and a Wireless Physical (WPHY) layer for constructing a WPHY frame from the WMAC frame.

Certain embodiments of the invention also include a method for operating a device for transmission of data in a wireless network. The method includes constructing a WMAC frame from the data and constructing a WPHY frame from the WMAC frame.

Certain embodiments of the invention also include a computer readable medium having stored thereon computer executable code that when executed causing a processor or computer to perform the process of constructing a WMAC frame from the data and constructing a WPHY frame from the WMAC frame.

Other embodiments of the invention may provide that the WMAC frame includes an aggregation of a plurality of MAC Service Data Units (MSDUs); the WMAC layer is capable of providing a reliable link by implementing an implied ACK and a block ACK; the WMAC layer is capable of establishing a wireless link between components connected to the device; the WPHY frame is configured to provide a mechanism for a bi-directional communication between components; or the content of the WPHY frame is determined according to a communication state between two communicating components.

BRIEF DESCRIPTION OF THE DRAWINGS

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

DETAILED DESCRIPTION OF THE INVENTION

Figure 1:
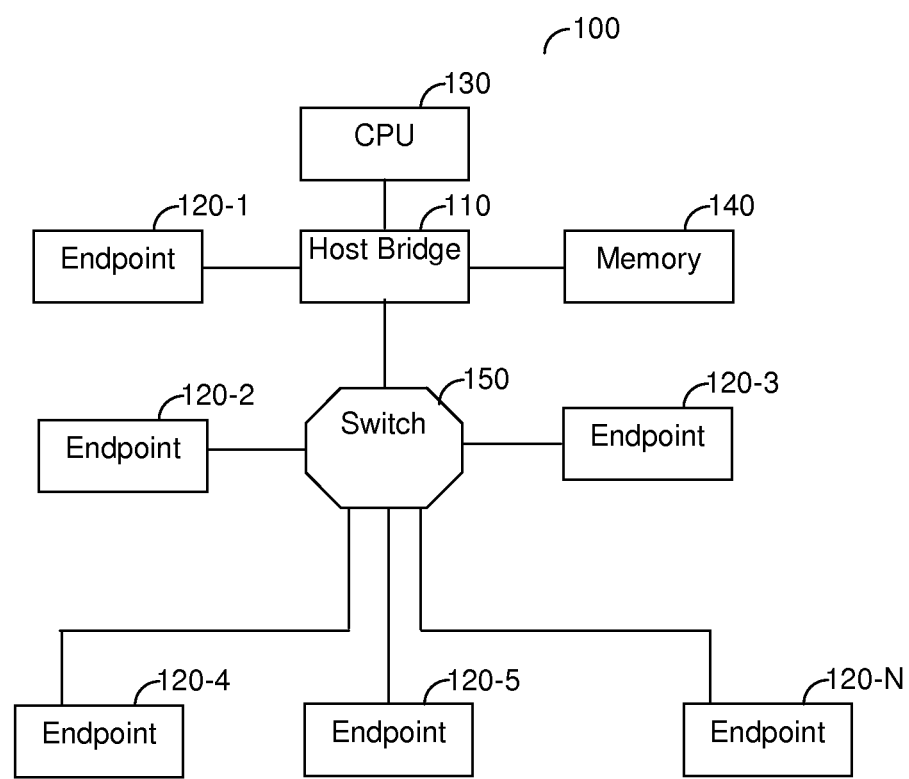
FIG. 1 is a block diagram showing a conventional architecture of a computer computing device.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In accordance with certain embodiments of the invention it is provided a low latency bus protocol, a device and method that enables the connectivity of peripheral devices over a wireless medium. The low latency transmission is realized by modifying the Physical (PHY) layer and Medium Access Control (MAC) layer of a standard wireless communication protocol including, but not limited to, the protocol defined in the IEEE 802.15 standard (hereinafter the "802.15 protocol").

Generally, the 802.15 protocol refers to a family of IEEE standards dealing with communication between devices in the wireless Personal Area Network (PAN). A typical PAN includes a coordinator and one or more devices. The coordinator controls the transmission over the PAN by sending beacons to the one or more devices. The 802.15 protocol defines a mechanism that ensures collision avoidance through a Channel Time Allocation (CTA) period. That is, during a CTA period only a single device "talks" while the other paired device in the PAN "listen". The 802.15 protocol is designed to enable a Time Division Duplex (TDD) mode of operation.

Figure 2:
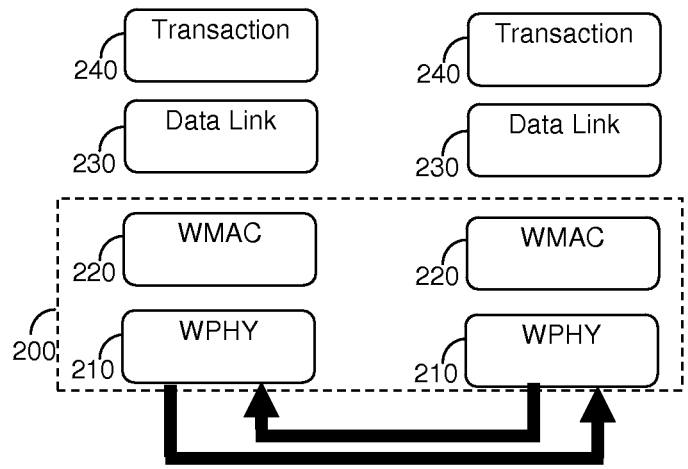
FIG. 2 is a diagram illustrating the layers of the low latency interconnect bus protocol realized in accordance with an embodiment of the invention.

The low latency interconnect bus protocol realized in accordance with an embodiment of the invention is based on a layered protocol. As illustrated in FIG. 2, the layers of a low latency bus protocol 200 include a Wireless Physical (WPHY) layer 210 and a Wireless MAC (WMAC) layer 220. The layer protocol 200 may also include a data link layer 230 and a transaction layer 240. In one embodiment of the invention, the layers 230 and 240 are layers of a PCIe bus. In this embodiment, the transaction layer 240 is responsible for assembling and disassembling Transaction Layer Packets (TLPs). TLPs are used to carry transactions, where each TLP has a unique identifier that enables a response directed at the originator. The size of a typical (TLP) is relatively small (e.g., 4 Bytes to 256 Bytes). The data link 230 acts as an intermediate between the transaction layer 240 and WPHY 310, and provides a reliable mechanism for exchanging TLPs. It should be noted that the layers 230 and 240 are not limited to PCIe layers and can be replaced by layers of any high speed serial interconnect bus that requires low latency data transfer.

The WPHY layer 210 is adapted to enable at least a bi-directional communication between components including, but not limited to, PCIe components during a single CTA. The WMAC layer 220 reduces the latency involved with sending data over a wireless medium in a TDD fashion. In addition, the WMAC layer 220 is responsible for establishing the wireless link between the components.

Figure 3A:
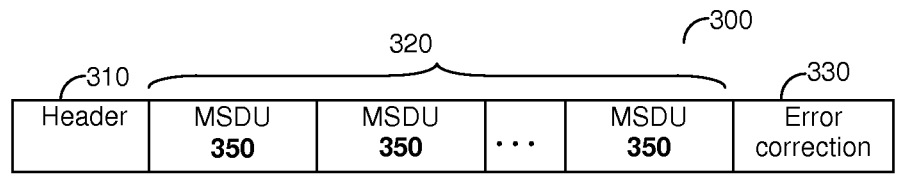
FIGS. 3A and 3B are respective diagrams of a WMAC frame and a MSDU constructed in accordance an embodiment of the invention.

In accordance with one embodiment of the present invention, the WMAC layer 220 aggregates data received from the transaction layer 240 and generates a WMAC frame. An exemplary structure of an (aggregated) WMAC frame 300 is shown in FIG. 3A. The WMAC frame 300 includes a header field 310, a data portion 320 and an error correction field 330 with an error detection code (e.g., a CRC, a checksum, etc.) including the WMAC frame header 310. The header 310 may include a source address, a destination address, the TDD schedule, the network capabilities, or any other type of information used for managing the wireless link. The data portion 320 includes an aggregation of a plurality of MAC Service Data Units (MSDUs) 350.

Figure 3B:
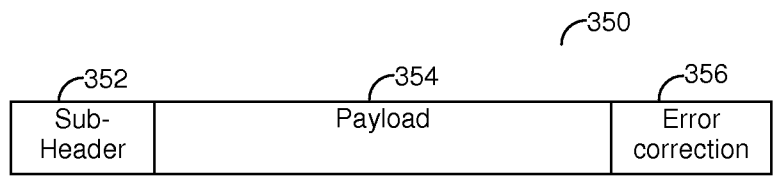

As shown in FIG. 3B each MSDU 350 includes a sub-header 352 a payload 354. In some exemplary embodiments the MSDU 350 includes an error correction field 356. The payload 354 may include one of: a data packet, such as a Transaction Layer Packet (TLP) received from the layer 240, an idle packet or a block ACK. The error correction field 356 includes a code (e.g., a CRC code, a checksum, etc.) computed over the data in the payload 354. The sub-header 352 may include a sequence number, a length, and a payload type (i.e., a data packet, an idle packet, or a block ACK) of the MSDU.

The aggregation of MSDUs, and thereby TLPs is essential to increase the efficiency of transmitting data over a wireless medium. As mentioned above, the size of a typical TLP is small, and therefore sending WMAC frames 300 without aggregating of TLPs significantly decreases the performance of the bus, as the overhead in transmitting a single TLP is high.

The aggregated MSDUs must be received in the same order that they were transmitted. That is, out of order MSDUs are delayed by the destination MAC, until all MSDUs are available in-order. With this aim, the WMAC layer 220 further provides a reliable link for the transaction layer 240 by implementing two mechanisms for ensuring that MSDUs sent from a source component (originated at a source WMAC layer 220) are received with minimum latency in-order at the destination WMAC layer. These mechanisms include an implied ACK and a block ACK. To simplify the description of these mechanisms the source WMAC layer and destination WMAC layer will be referred hereinafter as layers 220-1 and 220-2 respectively.

An implied ACK is sent from the destination WMAC layer 220-2 to the source WMAC layer 220-1 and includes the sequence number of the most-recent consecutive MSDU received at the destination. For example, if a WMAC frame containing MSDUs having sequence numbers 1, 2, 3, 4, 5, 6 and 7, but the destination WMAC layer 220-2 received only MSDUs having sequence numbers 1, 2, 3, 6 and 7, in this case, the implied ACK includes the number 3 indicating that MSDUs 1, 2 and 3 received according to their order in the destination WMAC layer 220-2. The implied ACK is sent in the WMAC frame header 310.

The block ACK mechanism provides an indication which MSDUs were correctly received at the destination WMAC layer 220-2, and those MSDUs that should be retransmitted by the source WMAC layer 220-1. Specifically, the block ACK indicates the sequence number of the most-recent and non-consecutive acknowledged MSDU. In the case of the above example, the block ACK includes the number 1, 2, 3, 6 and 7 of the most recent non-consecutive acknowledged MSDU. The block ACK may be sent in a WMAC frame as a MSDU, where the number is inserted to the payload and the payload type in the sub-header is designated as a "block ACK."

The implied ACK allows the source WMAC layer 220-1 to release all consecutive MSDUs that were acknowledged (e.g., MSDUs 1, 2 and 3). All acknowledged MSDUs which were not acknowledged by the destination WMAC layer 220-2 are kept at the source WMAC layer 220-1. Those MSDUs are retransmitted by the WMAC layer 220-1, upon reception of a block ACK request. In accordance with an embodiment of the invention, the source WMAC layer 220-1 is required to manage a retransmission reference number which is updated to the next (new) MSDU sequence number following the retransmitted MSDU. The source WMAC layer 220-1 retransmits MSDUs having a reference-sequence number lower than the number indicated in the block ACK frame.

Referring to the above example, the retransmission reference number is set to 3, the block ACK is 7, and therefore MSDUs 4 and 5 are retransmitted, since their reference number entries would be the consecutive numbers of the reference number. This mechanism allows the source WMAC layer 220-1 to avoid repeated retransmission of non-acknowledged MSDUs, thereby decreasing the latency of data retransmissions and increasing the wireless network efficiency.

In a preferred embodiment the WMAC frame 300 header field 310 contains a field which indicates the receiver's buffer size for a better flow control between the transmitter and the receiver. The header field 310 is a message sent from the receiver to the transmitter in which the receiver informs the transmitter its available buffer size. In general, the transmitter should consider the receiver's buffer size and not transmit more than the receiver capacity as indicated by the buffer size. The indication from the receiver to the transmitter is per Block ACK, therefore it is dynamic and can accommodate dynamic changes in the receiver buffer size.

Figure 4:
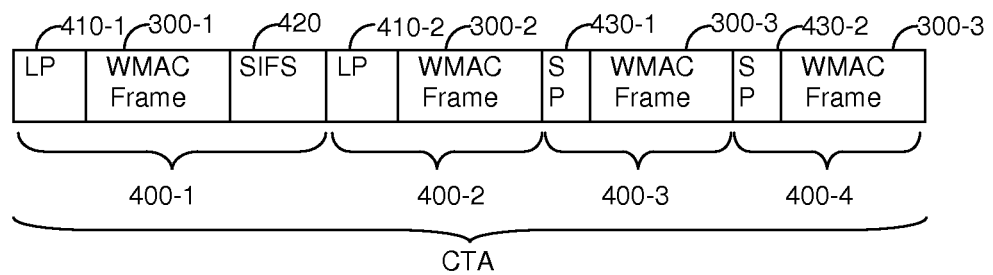
FIG. 4 is a diagram of a WPHY frame structure constructed in accordance an embodiment of the invention.

The WPHY layer 210 receives the WMAC frame 300 and constructs one or more WPHY frames 400, such as shown in FIG. 4 (e.g. 400-1, 400-2, 400-3, 400-4). The frame 400 allows the bi-directional communication between two PCIe components during a single CTA. The frame 400 may be constructed to include a long preamble 410, a Short Inter-Frame Space (SIFS) field 420, a short preamble (SP) 430, and a WMAC frame 300.

The long preamble field 410 is a predefined sequence utilized for signal detection, energy measurements, time, frequency and phase synchronization, channel estimation, antenna steering, calibrations, frame delimiters, etc. The short preamble 430 may be used for fast channel estimation, channel acquisition, frequency and time errors estimation, etc. The WMAC frame 300 can be sent either by the source layer 220-1 or the destination layer 220-2.

The content of the WPHY frame 400 is determined according to the communication state between two communicating components. Specifically, a long preamble 410 is included in a WPHY frame 400 at the first time that a WMAC frame 400 is sent. When the two components exchange the long preamble 410, the switching between WMAC frames 300 is performed using short preambles 430. It should be noted that the size of the long preamble is longer than the short preamble.

In the example shown in FIG. 4, during a single CTA, four WPHY frames 400-1 through 400-4 are transferred between two components A and B. The first frame 400-1 is sent from the component-A and includes a long preamble 410-1, a SIFS 420 and a WMAC frame 300-1. The second frame 400-2 is the first frame sent from the component-B and also includes a long preamble 410-2 and a WMAC frame 300-2. A third frame 400-3 is sent from the component-A and includes a short preamble 430-1 and a WMAC frame 300-3. A forth frame 400-4 is sent from the component-B and includes a short preamble and a WMAC frame 300-4. The inter frame spacing of the frames 400-3 and 400-4 is shorter than SIFS 420.

Figure 5:
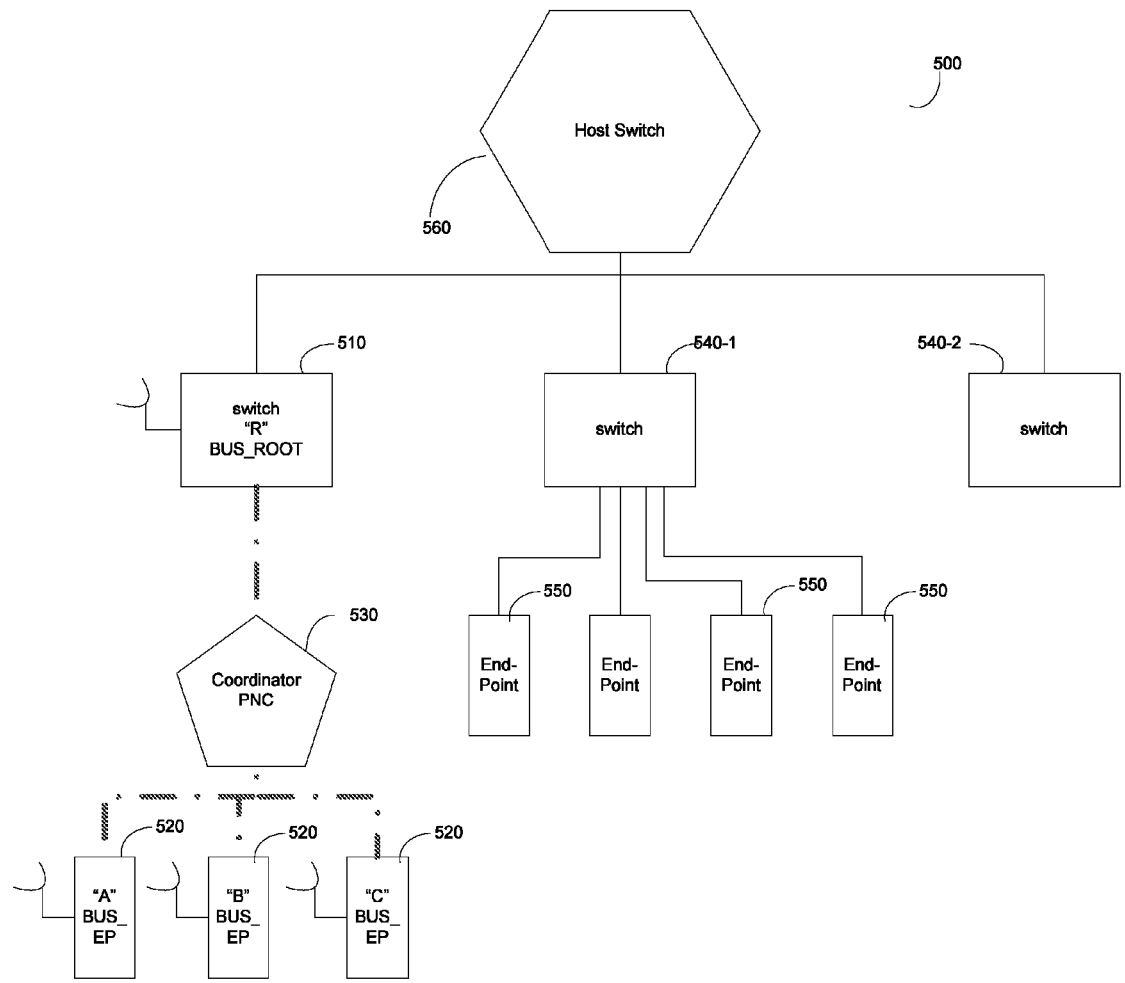
FIG. 5 is a diagram of a wireless fabric constructed according to an embodiment of the invention.

In accordance with one embodiment of the invention the low latency interconnect bus protocol 200 can be utilized in a computing device to wirelessly connect a plurality of peripheral components to the device. The computing device may be, but is not limited to, a personal computer, a laptop, a media player, a mobile phone, a personal digital assistant (PDA), and the likes. FIG. 5 is a block diagram of a fabric 500 used for enabling wireless connectivity between peripheral components using the low latency interconnect bus protocol 200.

In accordance with one embodiment of the invention a switch 510 communicates with a plurality of endpoints 520, over a wireless medium, through a coordinator 530. The switch 510 and endpoints 520 implement the layer protocol 200 and are compliant with at least the PCIe specification. The switches 540-1 and 540-2 and the endpoints 550 are standard PCIe components. A host switch 560 identifies the switch 510 and endpoints 520 as standard PCIe components. Therefore, data is transferred between the switch 510 and endpoints 520, where the underlying wireless specifics are transparent to any component connected to the fabric 500.

Figure 6:
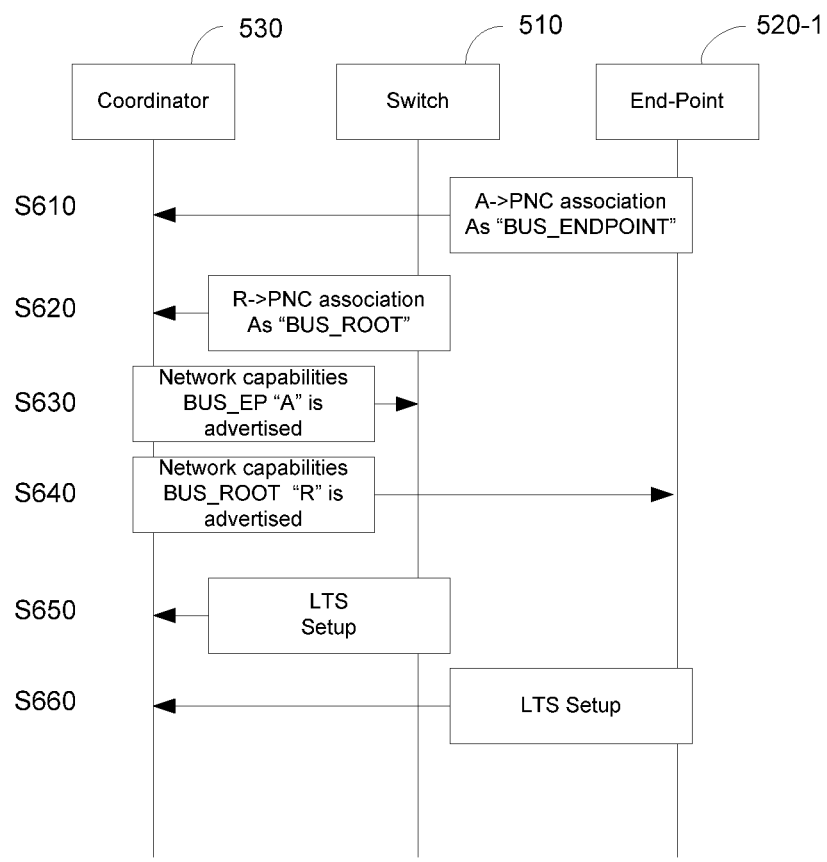
FIG. 6 is a diagram illustrating the process for establishing a wireless link between components connected using the low latency interconnect bus protocol in accordance with an embodiment of the invention.

In order to transfer data between the switch 510 and endpoints 520, firstly, a wireless link should be established between these components. The process for establishing the wireless link is described in FIG. 6. At S610, the endpoint 520-1 sends an association request to the coordinator 530. At S620, the switch 510 also sends an association request to the coordinator 530. At S630, the coordinator 530 transmits its network capabilities to the switch 510 and subsequently, at S640, the network capabilities are also advertised to the end-point 520-1. Thereafter, at S650, a request to setup a Link Transmission Slot (LTS) is sent from the switch 510 to the coordinator 530. At S660, a LTS setup request is sent from the endpoint 520-1 to the coordinator 530. Upon reception of the LTS setup requests a wireless link is established between the end-point 520-1, the switch 510 and the coordinator 530.

The invention has now been described with reference to specific embodiments where the low latency interconnect bus protocol is utilized to enable the connectivity of peripheral devices connected to PCIe components. Other embodiments will be apparent to those of ordinary skill in the art. For example, the low latency interconnect bus protocol can be adapted for the use with peripheral devices utilizing connection formats, such as PCIe second generation, PCIe third generation, USB, SATA, HyperTransport, Infiniband, serial and fast point-to-point interconnects, and the like.

The teachings of the invention described may be implemented in hardware, firmware, software or any combination therefore. In an embodiment of the present invention, some or all of the processes and components are implemented as a computer executable code. Such a computer executable code contains a plurality of computer instructions that when performed result with the execution of the tasks disclosed herein. Such computer executable code may be available as source code or in object code, and may be further comprised as part of, for example, a portable memory device or downloaded from the Internet, or embodied on a program storage unit or computer readable medium. The principles of the present invention may be implemented as a combination of hardware and software and because some of the constituent system components and methods depicted in the accompanying drawings may be implemented in software, the actual connections between the system components or the process function blocks may differ depending upon the manner in which the present invention is programmed.

The computer executable code may be uploaded to, and executed by, a machine comprising any suitable architecture. Preferably, the machine is implemented on a computer platform having hardware such as one or more central processing units ("CPUs"), a random access memory ("RAM"), and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Explicit use of the term CPU, "processor" or "controller" should not be construed to refer exclusively to hardware capable of executing software, and may implicitly include, without limitation, digital signal processor hardware, ROM, RAM, and non-volatile storage.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A device for transmitting data over a wireless network, the device is configured to operate a low latency interconnect bus protocol of an interconnect bus, the protocol comprising:
   a wireless medium access control (WMAC) layer for constructing a WMAC frame from the data, wherein the WMAC frame comprises a header field and a data portion, wherein the data portion includes an aggregation of a plurality of medium access control service data units (MSDUs) being aggregated according to their transmission order, the MSDUs include transaction layer packets generated by any one of a first component and a second component of the interconnect bus, wherein the first component is coupled to the device, wherein the header field includes at least an indication of a buffer size of a receiver for enabling a flow control between the device transmitting the data and the receiver; and
   a wireless physical (WPHY) layer for constructing at least one WPHY frame from the WMAC frame, wherein content of the at least one WPHY frame is determined according to a communication state between the first and second components, and a number of the constructed WPHY frames is based on a number of WPHY frames that can be bi-directionally communicated between the first component and the second component of the interconnect bus during a single channel time allocation (CTA).

2. The device of claim 1, wherein the WMAC frame further comprises an error correction field including an error detection code computed over the data in the header field.

3. The device of claim 2, wherein each of the plurality of MSDUs comprises a sub-header and a payload; wherein the sub-header includes at least a length field.

4. The device of claim 3, wherein the WMAC layer is further being capable of providing a reliable wireless link between the first component and the second component of the interconnect bus by implementing an implied acknowledgment (ACK) mechanism and a block ACK mechanism.

5. The device of claim 4, wherein the implied ACK mechanism is implemented by including a sequence number of a most-recent consecutive MSDU received in an implied ACK message; and wherein the block ACK mechanism is implemented by including a sequence number of a most-recent and non-consecutive acknowledged MSDU in a block ACK message.

6. The device of claim 4, wherein the content of the WPHY frame is determined according to a communication state between the first component and the second component, wherein a first transmitted WPHY frame includes a long preamble and subsequent WPHY frames includes a short preamble.

7. The device of claim 1, wherein the interconnect bus is a PCIe bus and the transaction layer packets are transaction layer packets (TLPs) generated by the PCIe protocol implemented by any one of the first component and the second component of the interconnect bus.

8. A method for operating low latency interconnect bus protocol in an interconnect bus for transmission of data in a wireless network, the method comprising:
   constructing a wireless medium access control (WMAC) frame from the data, wherein the WMAC frame comprises a header field and a data portion, wherein the data portion includes an aggregation of a plurality of medium access control service data units (MSDUs) being aggregated according to their transmission order, the MSDUs include transaction layer packets generated by any one of a first component and a second component of the interconnect bus, wherein the header field includes at least an indication of a buffer size of a receiver for enabling a flow control between the transmitter transmitting the data and the receiver;
   constructing wireless physical (WPHY) frames from the WMAC frame, wherein content of the at least one WPHY frame is determined according to a communication state between the first and second components, and a number of the constructed WPHY frames is based on a number of WPHY frames that can be bi-directionally communicated between the first component and the second component of the interconnect bus during a single channel time allocation (CTA); and
   transmitting by a device coupled to the first component the WPHY frames from the first component of the bus to the second component of the bus over a wireless link during the CTA.

9. The method of claim 8, wherein the WMAC frame further comprises an error correction field including an error detection code computed over the data in the header field.

10. The method of claim 9, each MSDU comprises: a sub-header and a payload; wherein the sub-header includes at least a length field; wherein the payload includes any one of: a data packet, an idle packet, or a block ACK.

11. The method of claim 10, wherein the WMAC layer is further being capable of providing a reliable wireless link between a first component and a second component of the bus by implementing an implied acknowledgment (ACK) mechanism and a block ACK mechanism.

12. The method of claim 11, wherein the implied ACK mechanism is implemented by including a sequence number of a most-recent consecutive MSDU received in an implied ACK message; and wherein the block ACK mechanism is implemented by including a sequence number of a most-recent and non-consecutive acknowledged MSDU in a block ACK message.

13. The method of claim 12, further comprising:
   constructing the content of the WPHY frame according to a communication state between the first component and the second component, wherein a transmitted first WPHY frame includes a long preamble and subsequent WPHY frames the WMAC frame include a short preamble.

14. The method of claim 13, wherein the first component and the second component are PCIe bus components and include any of: a switch, an endpoint, a coordinator.

15. The method of claim 14, wherein establishing the wireless link further comprising:
- sending an association request from the endpoint to the coordinator;
- sending an association request from the switch to the coordinator;
- transmitting network capabilities from the coordinator to the switch;
- transmitting network capabilities from the coordinator to the endpoint;
- sending a link transmission slot (LTS) setup request from the switch to the coordinator; and
- sending a LTS setup request from the endpoint to the coordinator.

16. A non-transitory computer readable medium having stored thereon computer executable code when executed causing a computer or processor in a bus for transmission of data in a wireless network to perform a process of:
- constructing a wireless medium access control (WMAC) frame from the data, wherein the WMAC frame comprises a header field and a data portion, wherein the data portion includes an aggregation of a plurality of medium access control service data units (MSDUs) being aggregated according to their transmission order, the MSDUs include transaction layer packets generated by any one of a first component and a second component of the interconnect bus, wherein the header field includes at least an indication of a buffer size of a receiver for enabling a flow control between the transmitter transmitting the data and the receiver;
- constructing wireless physical (WPHY) frames from the WMAC frame, wherein content of the at least one WPHY frame is determined according to a communication state between the first and second components, and a number of the constructed WPHY frames is based on a number of WPHY frames that can be bi-directionally communicated between the first component and the second component of the interconnect bus during a channel time allocation (CTA); and
- transmitting by a device coupled to the first component the WPHY frames from the first component of the bus to the second component of the bus over a wireless link during the CTA.

17. The device of claim 1, wherein the first component and the second component are PCIe bus components and include any of: a switch, an endpoint, a coordinator.

18. The method of claim 8, wherein the interconnect bus is a PCIe bus and the transaction layer packets are transaction layer packets generated by the PCIe protocol implemented by any one of the first component and the second component of the interconnect bus.

* * * * *